(12) United States Patent
Leshniak

(10) Patent No.: US 9,795,011 B2
(45) Date of Patent: Oct. 17, 2017

(54) LED LIGHTING SYSTEM DRIVEN AT HIGH VOLTAGE DC

(71) Applicant: AMERLUX LLC, Oakland, NJ (US)

(72) Inventor: Itai Leshniak, Fair Lawn, NJ (US)

(73) Assignee: AMERLUX LLC, Oakland, NJ (US)

( * ) Notice: Subject to any disclaimer, the term of this patent is extended or adjusted under 35 U.S.C. 154(b) by 0 days.

(21) Appl. No.: 14/195,464

(22) Filed: Mar. 3, 2014

(65) Prior Publication Data

US 2014/0246986 A1 Sep. 4, 2014

Related U.S. Application Data

(60) Provisional application No. 61/771,931, filed on Mar. 3, 2013.

(51) Int. Cl.
*H05B 37/02* (2006.01)
*H05B 33/08* (2006.01)

(52) U.S. Cl.
CPC ..... *H05B 37/0245* (2013.01); *H05B 33/0842* (2013.01)

(58) Field of Classification Search
USPC ............ 315/209 R, 210, 291, 292, 294
See application file for complete search history.

(56) References Cited

U.S. PATENT DOCUMENTS

| | | | |
|---|---|---|---|
| 2011/0204820 A1* | 8/2011 | Tikkanen et al. | 315/294 |
| 2011/0292703 A1* | 12/2011 | Cuk | H02M 1/4258 363/126 |
| 2012/0104966 A1* | 5/2012 | Taubert | 315/291 |
| 2012/0280637 A1* | 11/2012 | Tikkanen et al. | 315/294 |
| 2013/0063042 A1* | 3/2013 | Bora | H05B 33/0863 315/292 |
| 2014/0103804 A1* | 4/2014 | Zhdanau et al. | 315/85 |
| 2014/0239810 A1* | 8/2014 | Martin-Lopez | H05B 37/02 315/85 |
| 2014/0361701 A1* | 12/2014 | Siessegger et al. | 315/200 R |

FOREIGN PATENT DOCUMENTS

KR   10-1095506 B1   12/2011

* cited by examiner

*Primary Examiner* — Thuy Vinh Tran
(74) *Attorney, Agent, or Firm* — Day Pitney LLP

(57) ABSTRACT

A DC-powered LED lighting device and a lighting system using such devices are disclosed. A common AC/DC power supply is coupled to at least one electric main and provides power to the LED lighting devices at DC voltages that are higher than the peak voltage of the sine wave of the at least one electric main.

18 Claims, 2 Drawing Sheets

LED LIGHTING SYSTEM DRIVEN AT HIGH VOLTAGE DC

CROSS-REFERENCE TO RELATED APPLICATIONS

This application claims the benefit of priority to U.S. Provisional Patent Application No. 61/771931, filed Mar. 3, 2013.

FIELD

The present disclosure relates to light emitting diode (LED) lighting devices and lighting systems using LED lighting devices.

BACKGROUND

Typically, a LED lighting device includes a regulated AC/DC power supply that converts an AC power input into a low-voltage DC output used for powering LED elements of the device. The present disclosure provides improvements vis-à-vis the state of the art.

SUMMARY OF THE DISCLOSURE

A DC-powered LED lighting device and a lighting system using such LED lighting devices are disclosed.

In one embodiment, the LED lighting device can include a DC/DC converter, a LED driving circuit, and one or more LED assemblies. The LED lighting device is DC-powered using a first DC voltage V1. The DC/DC converter converts the DC voltage V1 into a second, lower DC voltage V2, which is used by the LED driving circuit for powering the LED assemblies.

In accordance with another aspect, the disclosure provides a system for powering the aforementioned LED lighting devices. This system includes an AC/DC power supply that is configured to be coupled to an AC electrical main, wherein the AC/DC power supply converts AC input power into DC output power at the DC voltage V1, where the voltage V1 is a DC voltage that is higher than the peak of the AC sine wave from the electrical main. The system further includes one or more of the aforementioned LED lighting devices, and a DC high voltage circuit that selectively energizes the LED lighting devices using power from the AC/DC power supply. In an exemplary embodiment, the DC voltage V1 can be higher than the voltage in the electric main.

Various other aspects and embodiments of the disclosure are described in further detail below. It has been contemplated that features of one embodiment of the disclosure may be incorporated in other embodiments thereof without further recitation.

The Summary is neither intended nor should it be construed as being representative of the full extent and scope of the present disclosure. All objects, features and advantages of the present disclosure will become apparent in the following detailed written description and in conjunction with the accompanying drawings.

The novel features believed being characteristic of the description are set forth in the appended claims.

Figure 1:
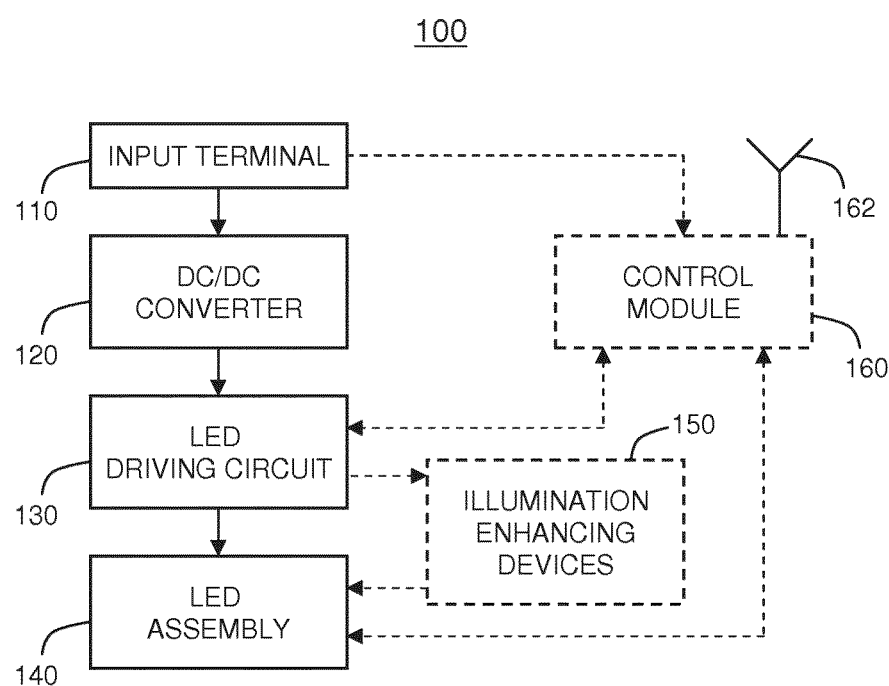
FIG. 1 depicts a high-level block diagram illustrating a LED lighting device according to one embodiment of the present disclosure.

The images in the drawings are simplified for illustrative purposes and are not depicted to scale. To facilitate understanding, identical reference numerals are used in the drawings to designate, where possible, substantially identical elements that are common to the figures, except that alpha-numerical extensions and/or suffixes may be added, when appropriate, to differentiate such elements.

DETAILED DESCRIPTION

For purposes of illustration, and not limitation, referring to FIG. 1, an illustrative LED lighting device 100 of the present disclosure includes an input terminal 110, a DC/DC (i.e., "direct current-to-direct current") converter 120, a LED driving circuit (or circuits) 130, a LED assembly (or assemblies) 140, an optional illumination-enhancing device(s) 150, and an optional control module 160 (one LED driving circuit 130 and one LED assembly 140 are shown).

The input terminal 110 is configured for coupling the LED lighting device 100 to a DC circuit 220 (shown in FIG. 2), which provides electric power to the device 100 at a DC voltage V1. The input terminal 110 has contacts isolated from one another and conforms to a form factor of an industry-standard or custom interconnect terminal as desired, such as a socket-type terminal, a plug-type terminal, a clamp-on terminal, a wired-type terminal or a track-mountable terminal, among other types of electric terminals. In an alternate embodiment, the input terminal 110 may be a portion of the DC/DC converter 120.

In some embodiments, in addition to conducting DC current to the converter 120, at least some contacts of the input terminal 110 may be adapted for conducting control/feedback signals used by the control module 160. In alternate embodiments, the input terminal 110 may have additional contacts for conducting at least a portion of such signals. In yet further embodiments, the control/feedback signals may, at least win part, be transmitted to/from the LED lighting device(s) 100 using wireless data transmission techniques (e.g., WiFi, Bluetooth, RFID, and the like), as illustrated in FIG. 1 by an antenna 162.

The DC/DC converter 120 can be a general-purpose DC/DC converter (e.g., a DC/DC power supply including a step down transformer) that is configured to convert input DC power at the DC voltage V1 into output DC power at the DC voltage V2, which is used by the LED driving circuit(s) 130 for powering the LED assembly/assemblies 140. The power rating of the DC/DC converter 120 can be selected appropriately based on the power requirements of the particular driving circuits and LED assemblies used in a particular application.

In alternate embodiments that are not specifically illustrated in the Figures, the DC/DC converter 120 may include series or parallel networks of component DC/DC converters. DC/DC converters may be connected in series, as desired, in order to operate as step-down units that reduce, in steps, the DC voltage V1 to the DC voltage V2, as well as provide one or more intermediate DC voltages V3, where V3<V1 and V3>V2. Correspondingly, DC/DC converters may be connected in parallel, for example, to be used for the selective powering of particular LED driving circuits 130, the illumination-enhancing devices 150, or the control module 160.

In some implementations, the DC voltage V1 is higher than the DC voltage V2. For example, in some LED lighting devices 100, the DC voltage V1 can be, for example, about 350-400 VDC, Hand the DC voltage V2 can be about 12-90 VDC. In other implementations, the DC voltage V1 can be selected in a range from about 100 to about 600 VDC. This can result in relatively lower ohmic losses in the higher voltage lines, as the current is correspondingly reduced for a given amount of electrical power. If desired, however, the DC voltage V1 may also be equal or substantially the same as V2.

The LED driving circuit 130 is preferably an electronic module that regulates the light output of the LED lighting device 100 by providing and controlling electric power (e.g., voltages, currents and timing of applied voltages) to the LED assembly (or assemblies) 140. In some embodiments, the LED driving circuit 130 can be a stand-alone module or may alternatively be an assembly of component modules, such as wired or printed circuit boards (PCBs), integrated circuits (ICs), or a combination thereof.

Additionally or alternatively, the LED driving circuit 130 may receive commands from and/or provide feedback signals to the control module 160, as well as incorporate portions thereof. Functions of the control module 160 can include, for example, at least one of (i) turning the LED lighting device 100 on or off, (ii) changing or modulating the intensity or color scheme of the produced illumination, (iii) performing in-situ optical, electrical, or mechanical adjustments, and (iv) reporting on operational status/performance of components of the lighting device 100.

In some embodiments, the LED driving circuit 130 can also operate the illumination-enhancing devices 150 or portions thereof. The devices 150 generally include optical, electrical, or electro-mechanical devices enhancing or controlling optical properties or power consumption of the LED lighting device 100, such as dimmers, switches, and mechanisms for engaging/replacing lenses or optical filters or adjusting spatial/angular orientation of individual LEDs or groups of LEDs in the LED assemblies 140, among other devices.

The LED assembly 140 generally includes one or more LEDs or one or more groups of the LEDs electrically arranged as one or more series networks, parallel networks, or a combination of series and parallel networks of LEDs. Additionally, in some embodiments, the LED assembly 140 may include portions of the illumination-enhancing devices 150.

Figure 2:
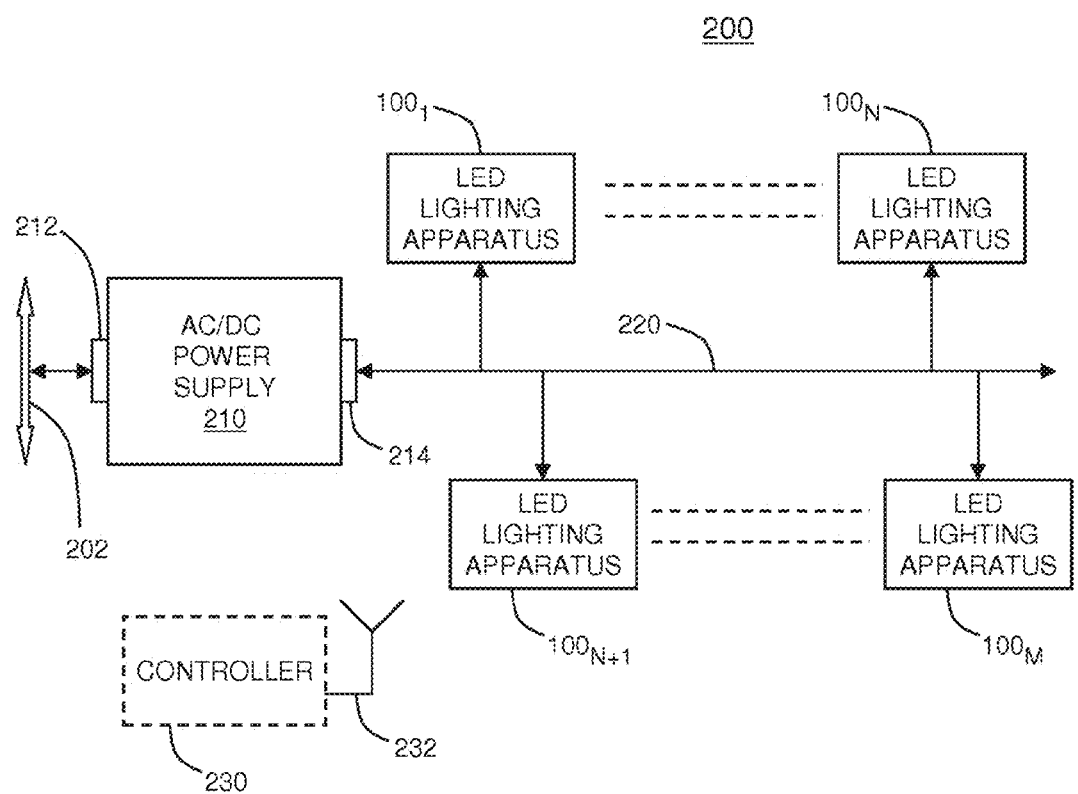
FIG. 2 depicts a high-level block diagram illustrating a lighting system according to one embodiment of the present disclosure.

For purposes of illustration, and not limitation, referring to FIG. 2, an exemplary LED lighting system 200 made in accordance with the present disclosure can include an AC/DC (i.e., "alternating current-to-direct current") power supply 210, a DC circuit 220, a plurality of LED lighting devices 100 (LED lighting devices $100_1$-$100_N$ and $100_{N+1}$-$100_M$, where N and M are integers and M>N≥1 are shown), and an optional controller 230.

The AC/DC power supply 210 includes an AC input terminal 212 and an DC output terminal 214. The AC/DC power supply 210 is coupled to an electric main 202 (e.g., operated by a local utility) by way of the AC input terminal 212. In operation, the AC/DC power supply 210 converts input AC power from the electric main 202 into DC output power at the DC voltage V1 (discussed above in rev. to FIG. 1), which is provided to the DC output terminal 214.

In most public, commercial, industrial, and residential lighting applications, the electric main 202 typically supplies AC power (e.g., 3-phase AC power) provided by way of various wiring schemes (e.g., Delta, Wye, etc.), as desired. It will be appreciated by those of skill in the art that the AC/DC power supply 210 may be coupled to the electric main 202 by way of other configurations.

Generally, the AC/DC power supply 210 is a regulated power supply producing a pre-determined, conditioned DC output (e.g., voltage/current stabilized output, voltage/current limited output, filtered/surge protected output, and the like). However, win some applications, the AC/DC power supply 210 may be an unregulated or partially regulated (e.g., voltage-limited) AC/DC power supply. In some embodiments, the AC/DC power supply 210 may be reduced to practice as an assembly of individual functional modules.

The LED lighting devices 100 can be selectively connected, by way of the DC circuit 220, to the output DC terminal 214 of the AC/DC power supply 210. A use in the LED lighting system 200 of a common power source (i.e., the AC/DC power supply 210), as well as powering of the LED lighting devices 100 using DC voltages allow to increase power efficiency and reduce operating and equipment costs of the LED lighting system 100. Additionally, power efficiency of the LED lighting system 200 is increased by using of the DC voltage V1 higher than the RMS (root mean square) values of line or phase voltages in the electric main(s) 202.

In one preferred embodiment, the AC/DC power supply 210 provides, at the output terminal 214, a regulated output at the DC voltage V1 that is selected to be higher than or close to an amplitude of phase voltage $V_{L-N}$ or an amplitude of line voltage $V_{L-L}$ in the electric main(s) 202. Herein, the phase voltage $V_{L-N}$ is defined as voltage between a line conductor and a neutral conductor of the electric mains 202, and the line voltage $V_{L-L}$ is defined as voltage between two line conductors of the electric mains 202. It is preferred that V1 be higher than the peak of the AC sine wave in the electrical main. However, in lighting systems employing multiple LED lighting devices (e.g., lighting systems of public, commercial or industrial settings), such an approach can lead to power inefficiency and equipment redundancy. However, in lighting systems employing multiple LED lighting devices (e.g., lighting systems of public, commercial or industrial settings), such an approach can lead to power inefficiency and equipment redundancy.

In some applications, the AC/DC power supply 210 can be coupled to the electric main(s) 202 operating at the phase voltage $V_{L-N}$=110-277 VAC or at the line voltage $V_{L-L}$=230-347 VAC commonly used in the USA and other countries. In these applications, the DC voltage V1 is typically selected in a range of about 350-400 VDC.

However, in other embodiments of the LED lighting system 200, the DC voltage V1 may be either higher or lower than amplitudes of the corresponding voltages $V_{L-N}$ or $V_{L-L}$ of the electric means 202 (e.g., up to 100% higher or up to 50% lower than the voltages $V_{L-N}$ or $V_{L-L}$). In yet other embodiments of the LED lighting system 200, the DC voltage V2 may be higher than the voltages V1, $V_{L-N}$ or $V_{L-L}$.

In alternate embodiments of the LED lighting system 200, a value of the DC voltage V1 may be selected independently from the values of the voltages $V_{L-N}$ or $V_{L-L}$. For example, the DC voltage V1 may be selected in a range from 100 to 600 VDC. Correspondingly, the DC voltage V1 may be selected independently from a wiring scheme (e.g., Delta, Wye, etc.) of the electric main(s) 202 or a number of power/neutral lines thereof coupled to the AC/DC power supply 210.

The DC circuit 220 generally includes electrical wiring that rated to conduct electricity at the DC voltage V1. As such, the DC circuit 220 preferably matches or exceeds, with industry-required margins, output current and output voltage ratings of the AC/DC power supply 210. For coupling to the LED lighting devices 100, the DC circuit/wiring 220 may be provided with industry-standard or custom interconnect terminals, such as socket-type terminals, plug-type terminals, clamp-on terminals, wired-type terminals or track-mountable terminals, among other types of electric terminals. In some applications, in settings being illuminated using the LED lighting system 200, portions of existing AC wiring may meet the requirements for the DC wiring 220. This can facilitate the retrofitting of old lighting systems for a building with lighting systems as described therein.

In accordance with further embodiments, the controller 230 can communicate with the LED lighting device(s) 100 by generating control signals that are then selectively directed to the control modules 160 (discussed in ref. to FIG. 1) of the LED lighting devices 100 and/or by receiving feedback signals from the control modules 160. Communication links between the controller 230 and control modules 160 may be formed by using the DC circuit/wiring 220, dedicated control interfaces (not shown) coupling the controller 230 to the LED lighting devices 100, or wireless data transmission techniques (e.g., WiFi, Bluetooth, RFID, and the like), as illustrated in FIG. 2 by an antenna 232.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure.

What is claimed is:

1. A light emitting diode (LED) lighting system, comprising:
   a single AC/DC power supply, having an AC input terminal configured for being coupled to an AC electrical main and a DC output terminal, the AC/DC power supply configured to convert AC input power into DC output power at a first DC voltage (V1), wherein the first DC voltage (V1) is higher than the root mean square value of either a line voltage or phase voltage in the AC electrical main;
   the DC output terminal is connected to an input of each of a plurality of DC/DC converters, each of the DC/DC converters including an output connected to a respective LED driving circuit and adapted to convert electrical power at the first DC voltage (V1) into electrical power at a second DC voltage (V2) for the respective LED driving circuit, wherein each of the respective LED driving circuits is coupled to at least one LED assembly;
   wherein each of said at least one LED assembly is powered by the respective second DC voltage (V2); and
   a control module configured to control at least one of the LED driving circuits using wired or wireless data transmission techniques.

2. The lighting system of claim 1, wherein the first DC voltage (V1) is higher than the second DC voltage (V2).

3. The lighting system of claim 1, wherein the first DC voltage (V1) is selected in a range from about 100 to about 600 VDC.

4. The lighting system of claim 1, wherein the first DC voltage (V1) is between about 350-400 VDC and the second DC voltage (V2) is between about 12-90VDC.

5. The lighting system of claim 1, wherein the first DC voltage (V1) is equal to or lower than the second DC voltage (V2).

6. The lighting system of claim 1, wherein the DC output terminal includes wiring that provides electric power to the plurality of DC/DC converters at the first DC voltage (V1).

7. The lighting system of claim 1, wherein each of the at least one LED assembly includes at least one LED.

8. The lighting system of claim 1, wherein at least one of the at least one LED assembly each includes at least one network of LEDs.

9. The lighting system of claim 1, further comprising optical, electrical, or mechanical devices enhancing or controlling optical properties or power consumption.

10. A lighting system, comprising:
    a single AC/DC power supply configured to be coupled to at least one AC electric main, the single AC/DC power supply being configured to convert AC input power into output power at a first stepped up DC voltage (V1), wherein the first stepped up DC voltage (V1) is higher than the peak voltage of the sine wave of the at least one AC electric main;
    a plurality of DC/DC converters, each of the DC/DC converters including an output connected to a respective LED driving circuit, and adapted to convert electrical power at the first stepped up DC voltage (V1) into electrical power at a second DC voltage (V2) for the respective LED driving circuit, wherein each of the respective LED driving circuits is coupled to at least one LED assembly; and
    each of the LED assembly electrically coupled to the single AC/DC power supply, at least one of the LED assembly having one of said plurality of DC/DC converters configured to convert power at the first stepped up DC voltage (V1) into power at the second DC voltage (V2) to power each of said LED assemblies;
    wherein the first stepped up DC voltage (V1) is selected in a range from about 100 to about 600 VDC; and
    a controller configured to communicate to the LED assemblies using wired or wireless data transmission techniques.

11. The system of claim 10, wherein the first stepped up DC voltage (V1) is between about 350-400 VDC and the second DC voltage (V2) is between about 12-90VDC.

12. The system of claim 10, wherein each of the at least one DC/DC converters provides a constant current power source configured to drive the LED assembly to which it is coupled.

13. The system of claim 10, wherein the AC/DC power supply includes a regulated power supply.

14. The system of claim 10, wherein the LED driving circuit includes wiring that matches or exceeds output current and output voltage ratings of the AC/DC power supply.

15. The system of claim 10, wherein the AC/DC power supply includes a surge protector for protecting downstream components and a filter for conditioning the output current of the AC/DC converter.

16. A lighting system, comprising:
    a single AC/DC power supply including a filter and a surge protector, the single AC/DC power supply adapted to be coupled to at least one AC electric mains, the single AC/DC power supply being configured to convert AC input power into regulated power at a first DC voltage (V1) that is provided to at least one DC output terminal of the AC/DC power supply, wherein the first DC voltage (V1) is higher than the peak voltage of the sine wave of the at least one AC electric mains;
    at least one DC/DC converter connected to the at least one DC output terminal of the single AC/DC power supply, each DC/DC converter of the at least one DC/DC converter is adapted to convert electrical power at the first DC voltage (V1) into electrical power at a second DC voltage (V2);

a respective LED driving circuit coupled to a respective output of each of the at least one DC/DC converter, each LED driving circuit configured to supply a regulated output to a plurality of LED assemblies;

wherein, for each of the at least one DC/DC converter, the second DC voltage is less than the first DC voltage and the respective LED driving circuit is configured to selectively couple the plurality of LED assemblies to the respective DC/DC converter; and a control module configured to control at least one of the LED driving circuits using wired or wireless data transmission techniques.

17. The lighting system of claim 16, wherein the single AC/DC power supply is adapted to accept AC input power provided at 110-347 VAC.

18. The system of claim 16, wherein the first DC voltage (V1) as between about 350-400 VDC.

\* \* \* \* \*